US012723003B2

(12) United States Patent
Barbosa

(10) Patent No.: US 12,723,003 B2
(45) Date of Patent: Sep. 1, 2026

(54) MANUFACTURING PROCESS AND COMPOSITION OF CONCRETE ADDITIVE

(71) Applicant: MOSHE 3000 MATERIAIS DE CONSTRUÇÃO LTDA, Quatigua (BR)

(72) Inventor: Celso Barbosa, São Paulo (BR)

(73) Assignee: MOSHE 3000 MATERIAIS DE CONSTRUCÃO LTDA, São Paulo (BR)

( * ) Notice: Subject to any disclaimer, the term of this patent is extended or adjusted under 35 U.S.C. 154(b) by 368 days.

(21) Appl. No.: 18/564,385

(22) PCT Filed: Mar. 22, 2022

(86) PCT No.: PCT/BR2022/050103

§ 371 (c)(1),
(2) Date: Nov. 27, 2023

(87) PCT Pub. No.: WO2022/246525

PCT Pub. Date: Dec. 1, 2022

(65) Prior Publication Data

US 2024/0239710 A1 Jul. 18, 2024

(30) Foreign Application Priority Data

May 25, 2021 (BR) ..................... BR1020210101040

(51) Int. Cl.
*C04B 28/04* (2006.01)
*C04B 14/02* (2006.01)
(Continued)

(52) U.S. Cl.
CPC ............ *C04B 28/04* (2013.01); *C04B 14/024* (2013.01); *C04B 14/062* (2013.01); *C04B 14/28* (2013.01);
(Continued)

(58) Field of Classification Search
CPC ....... C04B 28/04; C04B 14/024; C04B 14/28; C04B 24/04; C04B 40/0042;
(Continued)

(56) References Cited

U.S. PATENT DOCUMENTS

2010/0132591 A1 6/2010 Constantz et al.

FOREIGN PATENT DOCUMENTS

CN 110204277 A * 9/2019 ............. C04B 14/06
EP 3623354 A1 * 3/2020 ............. C04B 28/02
(Continued)

OTHER PUBLICATIONS

Dunuweera et al. Cement types, composition, uses and advantages of nanocement, environmental impact on cement production, and possible solutions. Advances in Materials Science and Engineering. (Year: 2018).*

(Continued)

*Primary Examiner* — Amber R Orlando
*Assistant Examiner* — Anastasia A. Kuvayskaya
(74) *Attorney, Agent, or Firm* — MUNCY, GEISSLER, OLDS & LOWE, P.C.

(57) ABSTRACT

The current invention comprises the MANUFACTURING PROCESS AND COMPOSITION OF CONCRETE ADDITIVE with the purpose of adding hydrophobic and waterproofing properties to concrete, as well as improving its mechanical properties. The process involves two phases of component mixing/heating, and the additive composition comprises mortar, cement, calcium carbonate, active microsilica, calcium stearate, and graphite.

38 Claims, 2 Drawing Sheets

| Application | Dosage |
|---|---|
| Mortar for floor laying | 0.5 kg of additive for each 20 kg bag of mortar plus aggregates |
| Mortar for floor laying | 1 kg of additive for every 50 kg of cement plus aggregates |
| Mortar for plastering | 1 kg of additive for each 50 kg of cement plus aggregates |
| Mortar for plastering wet area or external area | 2 kg of additive for each 50 kg of cement plus aggregates |
| Screed material interior area (concrete) | 1 kg of additive for each 50 kg of cement plus aggregates |
| Covered structural slab | 1 kg of additive for each 50 kg of cement plus aggregates |
| Open structural slab | 2 kg of additive for each 50 kg of cement plus aggregates |
| Water reservoirs, pools, or concrete tanks | 4 kg of additive for each 50 kg of cement plus aggregates |
| Foundations and foundation beams | 2 kg of additive for each 50 kg of cement plus aggregates |
| Mortar for laying bricks or blocks | 1 kg of additive for each 50 kg of cement plus aggregates |

(51) Int. Cl.

| | |
|---|---|
| ***C04B 14/06*** | (2006.01) |
| ***C04B 14/28*** | (2006.01) |
| ***C04B 24/04*** | (2006.01) |
| ***C04B 40/00*** | (2006.01) |
| *C04B 103/32* | (2006.01) |
| *C04B 103/50* | (2006.01) |
| *C04B 103/65* | (2006.01) |

(52) U.S. Cl.

CPC .......... *C04B 24/04* (2013.01); *C04B 40/0042* (2013.01); *C04B 40/0082* (2013.01); *C04B 2103/32* (2013.01); *C04B 2103/50* (2013.01); *C04B 2103/65* (2013.01)

(58) Field of Classification Search

CPC ............ C04B 40/0082; C04B 2103/32; C04B 2103/50; C04B 2103/65; C04B 2111/27; Y02W 30/91

See application file for complete search history.

(56) References Cited

FOREIGN PATENT DOCUMENTS

| | | | | |
|---|---|---|---|---|
| WO | WO-9928264 A1 * | 6/1999 | .......... | C04B 18/146 |
| WO | WO-02/06182 A1 | 1/2002 | | |

OTHER PUBLICATIONS

CN-110204277-A_Machine Translation (Year: 2019).*

Dunuweera et al., "Cement Types, Composition, Uses and Advantages of Nanocement, Environmental Impact on Cement Production, and Possible Solutions," Advances in Materials Science and Engineering, vol. 2018, 11 pages.

* cited by examiner

| Application | Dosage |
| --- | --- |
| Mortar for floor laying | 0.5 kg of additive for each 20 kg bag of mortar plus aggregates |
| Mortar for floor laying | 1 kg of additive for every 50 kg of cement plus aggregates |
| Mortar for plastering | 1 kg of additive for each 50 kg of cement plus aggregates |
| Mortar for plastering wet area or external area | 2 kg of additive for each 50 kg of cement plus aggregates |
| Screed material interior area (concrete) | 1 kg of additive for each 50 kg of cement plus aggregates |
| Covered structural slab | 1 kg of additive for each 50 kg of cement plus aggregates |
| Open structural slab | 2 kg of additive for each 50 kg of cement plus aggregates |
| Water reservoirs, pools, or concrete tanks | 4 kg of additive for each 50 kg of cement plus aggregates |
| Foundations and foundation beams | 2 kg of additive for each 50 kg of cement plus aggregates |
| Mortar for laying bricks or blocks | 1 kg of additive for each 50 kg of cement plus aggregates |

Figure 1

MANUFACTURING PROCESS AND COMPOSITION OF CONCRETE ADDITIVE

FIELD OF THE INVENTION

The current invention is applied in the field of the 100% mineral additives for concrete, more specifically those that have hydrophobic and waterproofing properties, to improve the mechanical properties of the concrete further.

The concrete additive described in this document is used in several lines of civil construction, such as: construction of bridges, viaducts, tunnels, cisterns, sidewalks, building foundations, etc. In summary, the additive is recommended for any application where the concrete is exposed to an environment with high humidity and therefore the protection against it is required.

DESCRIPTION OF THE RELATED ART

The process already known in the state of the art for waterproofing concrete uses a waterproofing blanket that requires specific equipment and tools. The application of this blanket, in addition to compromising the worker's health, also compromises his/her safety.

Following such a method, methane gas is used to burn and adhere the waterproofing blanket. This gas has risky handling, is highly harmful to the environment, and also requires specialized labor to prevent any type of accident.

Once the blanket application is complete, a watertightness test of the structure is required, which can take up to 15 days, resulting in delays in the construction schedule. After this test, a mechanical protection for the concrete is indicated, so as not to damage what has already been done, additionally never being able to do any kind of drilling in the slab, because this would perforate the blanket and compromise the entire structure.

Some solutions in the state of the art that make it possible to solve, in an acceptable way, such problems in the usual processes of waterproofing are already found. However, none of the solutions is optimal and the current invention has significant improvements related to the results achieved.

The document WO1999028264, which has the priority year 1997, presents a concrete additive consisting of at least one pozzolanic material, such as microsilica, and one hydrophobic material, such as calcium stearate.

Despite the inclusion of some of the components of the concrete additive composition described in the current patent, the above-mentioned application does not perform the same manufacturing process, and its results are inferior to the results achieved by the current invention.

The document CN111410454, filed in 2019, reveals to us a method for preparing "superhydrophobic" concrete where there is, as in the previous document, the addition of microsilica and calcium stearate.

In the same sense as the PCT document, the Chinese document does not present the same method of manufacturing and mixing of the components of the present invention and, therefore, does not achieve its results.

SUMMARY OF THE INVENTION

The current invention comprises a PROCESS FOR MANUFACTURING AND COMPOSING A CONCRETE ADDITIVE that adds hydrophobic and waterproofing properties to concrete and improves its mechanical properties.

Additionally, by its hydrophobic and waterproofing action, the additive prevents the concrete from retaining moisture and, as a result, prevents fungi and bacteria. This technical effect has been tested and approved by the Healthy Building Certificate.

The additive is applied in mortars and concrete, reacting with cement during the hydration process, giving rise to inert mineral substances that block the capillary net, providing high impermeability to mortar and concrete. Additionally, the filling of voids provides a significant improvement in the mechanical resistance.

In an optional application, the concrete additive may further comprise superplasticizers and defoamers in amounts noted in the detailed description of the invention.

The great difference of the current invention when compared to other solutions present in the state of the art is that the manufacturing process contributes directly to the results achieved by the additive. The process involves mixing and heating several elements, which will be exposed later, with a prefabricated formulation that will also be exposed in this document.

Therefore, the process disclosed in this invention is as important as the composition of the additive, and a change in either would diminish the results obtained.

Tests were performed to verify the difference in concrete durability by comparing the results of samples with and without the additive disclosed in the current patent. For this, the same materials (cement, sand, gravel and water) and the same temperature and external pressure conditions were used for all samples.

The results obtained in the study commented above showed significant improvements on all fronts, where there was a 14% reduction in the void index, a 15% reduction in water absorption, a 35% reduction in pressure water penetration, and a 500% reduction in capillary rise height.

Regarding the duration of the effects achieved by the concrete additive, we can state that no decrease is observed over time, and its effects are permanent. This occurs because its use gives rise to inert mineral substances.

We can also state that, by reducing the causes of concrete degradation (results of the study mentioned above), the additive also protects it from aggregate alkali reactions and from corrosion caused by moisture, thus increasing its structural durability.

Depending on the dosage of concrete additive used in the final product, it is possible that the concrete reaches 100% impermeability and 100% water-repellency. However, it is not interesting that the final product reaches 100% water-repellency, because it would make the anchorage of paints or other coatings unfeasible, therefore it is recommended that the final product allows 0.3 mm of anchorage.

BRIEF DESCRIPTION OF THE DRAWINGS

The FIG. 1 shows the additive dosage for each specific use of the additive.

The FIG. 2 exemplifies the equipment used in the final mix for the production of the concrete additive.

DETAILED DESCRIPTION OF THE PREFERRED EMBODIMENT

Figure 2:
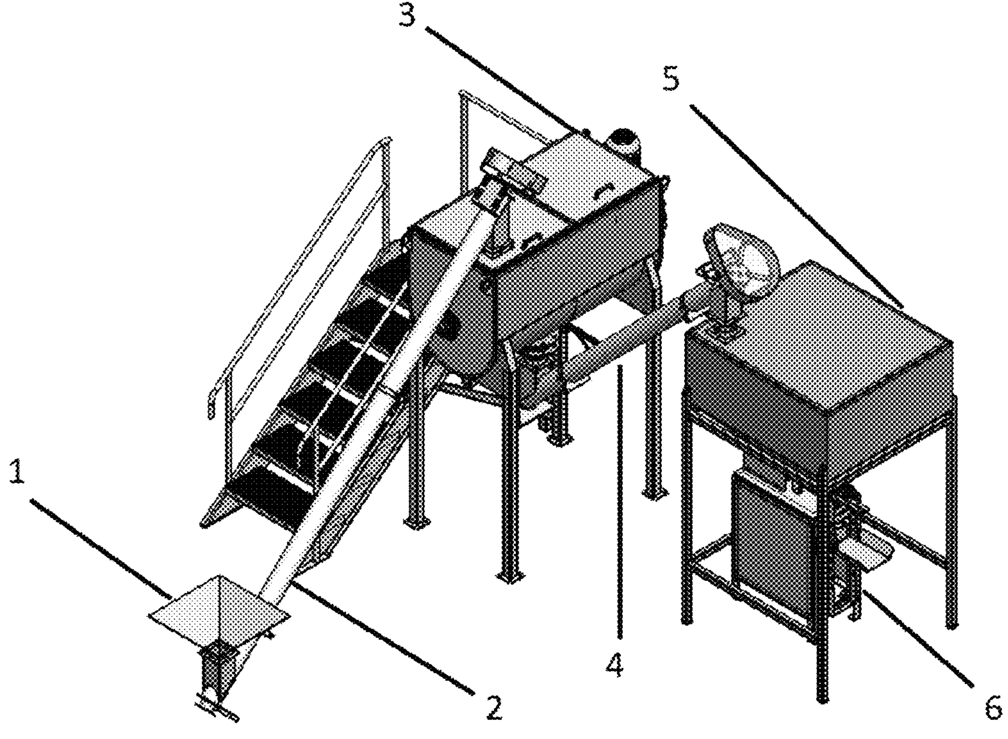

The current patent proposes a PROCESS FOR THE MANUFACTURING AND COMPOSITION OF CONCRETE ADDITIVE comprising in its composition (in mass): 30% to 50% AC mortar, 22% to 28% Portland cement, 15% to 25% calcium carbonate, 2% to 9% a pore blocker, preferably active microsilica, 3% to 7% a hydrophobic compound, preferably calcium stearate and 0.5% to 1.5% a formulation produced separately before mixing the other products.

The formulation mentioned above is composed (in mass) of 30% to 60% Portland cement, preferably 50%, 20% to 50% hydrophobic compound (calcium stearate), preferably 45% and 3% to 10% graphite, preferably 5%, which pass through an equipment of preferably 1,500 watts of power that, by electrofusion, heats and mixes, at a temperature of 70° C. to 150° C., preferably 140° C., for a period of 2 to 5 minutes, preferably 3 minutes. After this step, the mixture is transferred to a particle grinder to homogenize it properly, leaving nothing solid (the heating above may solidify some parts of the mixture). The mixture is properly weighed from 0.5% to 1.5%, preferably 1%, this formulation is placed in the secondary mixer, for a second mixing and heating, culminating in the final product. For convenience, we will call this formulation "formulation A".

With the previously produced formulation A, all components (formulation A, Portland cement, AC mortar, calcium carbonate, pore blocker and hydrophobic compound) are mixed together while being heated at a temperature of 70° C. to 170° C. (preferably 120° C.) for 20 to 30 minutes. After this time, the final mixture is sent to a resting silo, where it is subsequently bagged.

Any change in the time and temperature ranges of the manufacturing method will cause gradual loss of results in the final product, and it is always recommended to use the preferred temperature and time indicated. As a more extreme example, if the heating temperature of the mixture is exceeded, the components may burn and, as a consequence, the hydrophobic, waterproofing, and strength results of the concrete additive may be lost.

To understand the manufacturing process of the concrete additive better, FIG. 2 shows an example of machinery that can be used in the manufacture of the additive. The raw material is poured into the feed screw (1), where it is transported via the worm screw (2) to the heating mixer (3), where mixing and heating occurs as mentioned above. After this step, the mixture is transported by the endless screw (4) to the silo (5) where the final mixture is stored to be bagged by the bagging machine (6).

Although the additive shows the improvements reported above when manufactured following the ranges stipulated above, the optimal results are achieved with the following composition:

43% mortar AC;
27% cement CP2;
20% calcium carbonate
5% active microsilica
4% calcium stearate;
1% formula (A);

Not only can the dosage ranges of the mixture components be changed, but also the components themselves can be replaced by similar ones. However, the components described above were the ones that showed the best results.

Following this line of thought, the mortar can be chosen among the classifications AC1, AC2 and AC3, depending on the type of application. Taking as an example, the AC1 classification is usually used for laying ceramic tiles and floors, while AC2 is chosen when the use is for outdoor environments and, finally, AC3 is the most adherent of the three and is commonly used for laying linings in hot water pools or saunas.

All types of Portland cement can be used. However, the best results were achieved with the type CP2. Depending on the type of application, Portland cement CP2 can be replaced by, for example, types CP1 (common), CP3 (blast furnace), CP4 (pozzolanic), CP V-ARI (high early strength), etc.

Calcium carbonate, also known as calcite, is a chemically inert, inorganic mineral extracted from mines and refined in various granulometric ranges according to the desired application. It has the function of helping in waterproofing and has encapsulated water-repellent characteristics.

Calcium stearate is the hydrophobic and waterproofing compound that can be replaced by: unsaturated fatty acids and their salts, with chains from C10 to C24, which can be stearic acid, magnesium stearate, sodium stearate, potassium stearate, fumaryl stearate, zinc stearate, aluminum stearate, and salts of transition metals. The following can also be used as hydrophobic compounds: silane, siloxanes, silicone, or a mixture of these.

Regarding the physical property, the calcium stearate or substitute material should have the average particle size (D50), when in the solid state, should be 100 nm to 50 μm, more preferably in the nanometer scale of 400 nm to 2000 nm.

The active microsilica is responsible for blocking concrete pores, since microsilica particles are 50 to 100 times smaller than cement grains and, depending on the degree of dispersion, fill up to 100% of the voids between them, making the concrete denser and thus ensuring lower permeability, excellent thixotropy, and strength by ensuring improved void filling, which significantly improves concrete resistance.

Microsilica can be replaced by: talc, pozzolans, graphite, graphene oxide, aluminosilicates such as bentonite, silicates, granulated blast furnace slag, calcined clays, fly ash, metakaolinite, calcite, aragonite, solid greases, and acrylic emulsions.

The pore blocker (the microsilica or its substitutes), should be thinly divided; the average particle size (D50) should be 500 nm to 100 μm.

In addition to the components described above, the current invention also discloses other concretizations where superplasticizer components are added, from 3% to 30% by mass and/or defoamers from 1% to 10% by mass and/or 0.2% to 1% by mass of graphene. The addition of these components is done at the time of mixing all the components, participating in the mixing and heating step along with the other components.

The superplasticizer can be one of the following (or a mixture of them): lignosulfonate, naphthalene formaldehyde sulfonate, melamine formaldehyde sulfonate, polycarboxylate esters.

The anti-foam can be one of the following components (or a mixture of them): mineral oil, silicone oil, vegetable oil, polyethylene glycol, polypropylene glycol, and polymethylacrylate.

Finally, the graphene is responsible for the improvement in the flexural resistance of the concrete, which can be more than 20% higher than concrete without the additive, depending on the dosage of additive used in the concrete.

As an example of complementary composition, we can cite:

42% AC mortar;
27% cement CP2;
20% calcium carbonate
5% active microsilica
4% calcium stearate;
1% formula A;
1% graphene.

The application of the concrete additive is done in the concrete mixer, and first the concrete without additive must be homogenized. After this homogenization, add the additive and homogenize for another 10 minutes, and then it is ready for the final application.

The recommended dosage of water repellent and waterproofing additive varies according to its application. Some of the most common applications are found in the spreadsheet in FIG. 2.

The invention claimed is:

1. A concrete additive composition comprising calcium carbonate, a pore blocker, a hydrophobic compound, and comprising in its composition:

a) AC (adhesive cement) mortar, b) Portland cement, and c) a separately produced formulation that is composed of Portland cement, hydrophobic compound and graphite.

2. The concrete additive composition according to claim 1, wherein the mortar is 30% to 50% of the composition, in mass, of the additive.

3. The concrete additive composition according to claim 1, wherein Portland cement is 22% to 28% of the composition, in mass, of the additive.

4. The concrete additive composition according to claim 1, wherein the calcium carbonate is 15% to 25% of the composition, by mass, of the additive.

5. The concrete additive composition according to claim 1, wherein the pore blocker is 2% to 9% of the composition, by mass, of the additive.

6. The concrete additive composition according to claim 1, wherein the hydrophobic compound is 3% to 7% of the composition, by mass, of the additive.

7. The concrete additive composition according to claim 1, wherein the separately produced formulation is 0.5% to 1.5% of the composition, by mass, of the additive.

8. The concrete additive composition according to claim 1, wherein the separately produced formulation is composed of 30% to 60% in mass Portland cement, 20% to 50% in mass hydrophobic compound and 3% to 10% in mass graphite.

9. The concrete additive composition according to claim 1, wherein the pore blocker is one or more of the following components: active microsilica, talc, pozzolans, graphite, graphene oxide, aluminosilicates, silicates, granulated blast furnace slag, calcined clays, fly ash, metakaolinite, calcite, aragonite, solid greases, and acrylic emulsions.

10. The concrete additive composition according to claim 1, wherein the pore blocker is an active microsilica.

11. The concrete additive composition according to claim 1, wherein the hydrophobic compound is one or more of the following components: unsaturated fatty acids and their salts, with chains from C10 to C24, stearic acid, magnesium stearate, sodium stearate, calcium stearate, potassium stearate, fumaryl stearate, zinc stearate, aluminum stearate, salts of transition metals, and hydrophobic compounds including: silane, siloxanes, silicone, or a mixture thereof.

12. The concrete additive composition according to claim 1, wherein the hydrophobic compound is calcium stearate.

13. The concrete additive composition according to claim 1, wherein the concrete additive further comprises: superplasticizer compound and/or defoaming compound and/or graphene.

14. The concrete additive composition according to claim 13, wherein the superplasticizer is 3% to 30% of the composition, in mass, of the additive.

15. The concrete additive composition according to claim 13, wherein the defoamers are 1% to 10% of the composition, in mass, of the additive.

16. The concrete additive composition according to claim 13, wherein the graphene is 0.2% to 1% of the composition, by mass, of the additive.

17. The concrete additive composition according to claim 13, wherein the superplasticizer compound is one or more of the following components: lignosulfonate, naphthalene formaldehyde sulfonate, melamine formaldehyde sulfonate, polycarboxylate esters.

18. The concrete additive composition according to claim 13, wherein the defoaming compound is one or more of the following components: mineral oil, silicone oil, vegetable oil, polyethylene glycol, polypropylene glycol, and polymethyl methacrylate.

19. A method of manufacturing a concrete additive, comprising:

separately producing a formulation composed of: Portland cement, hydrophobic compound and graphite;

heating the formulation from 70° C. to 150° C., homogenized properly in a grinder; and after producing the formulation, forming a second mixture while heating, at a temperature of 70° C. to 170°, the second mixture having a composition comprising: Portland cement, AC (adhesive cement) mortar, calcium carbonate, pore blocker, hydrophobic compound, and the formulation, to generate a final product.

20. The method according to claim 19, wherein the previously produced formulation is mixed and heated for a period of 2 to 5 minutes.

21. The method according to claim 19, wherein the second mixture is mixed and heated for a period of 20 to 30 minutes.

22. The method according to claim 19, wherein the mortar is 30% to 50% of the composition, by mass, of the additive.

23. The method according to claim 19, wherein the Portland cement is 22% to 28% of the composition, by mass, of the additive.

24. The method according to claim 19, wherein the calcium carbonate is 15% to 25% of the composition, by mass, of the additive.

25. The method according to claim 19, wherein the pore blocker is 2% to 9% of the composition, by mass, of the additive.

26. The method according to claim 19, wherein the hydrophobic compound is 3% to 7% of the composition, by mass, of the additive.

27. The method according to claim 19, wherein the separately produced formulation is 0.5% to 1.5% of the additive composition by weight.

28. The method according to claim 19, wherein the separately produced formulation is composed of 30% to 60% in mass Portland cement, 20% to 50% in mass hydrophobic compound, and 3% to 10% in mass graphite.

29. The method according to claim 19, wherein the pore blocker is one or more of the following components: active microsilica, talc, pozzolans, graphite, graphene oxide, aluminosilicates, silicates, granulated blast furnace slag, calcined clays, fly ash, metakaolinite, calcite, aragonite, solid greases and acrylic emulsions.

30. The method according to claim 19, wherein pore blocker is an active microsilica.

31. The method according to claim 19, wherein the hydrophobic compound is one or more of the following components: unsaturated fatty acids and their salts, with chains from C10 to C24, stearic acid, magnesium stearate, sodium stearate, calcium stearate, potassium stearate, fumaryl stearate, zinc stearate, aluminum stearate, salts of transition metals, and hydrophobic compounds including: silane, siloxanes, silicone, or a mixture thereof.

32. The method according to claim 19, wherein the hydrophobic compound is calcium stearate.

33. The method according to claim 19, wherein the concrete additive further comprises: superplasticizer compound and/or defoaming compound, and/or graphene.

34. The method according to claim 33, wherein the superplasticizer is 3% to 30% of the composition, by mass, of the additive.

35. The method according to claim 33, wherein the defoamers are 1% to 10% of the composition, by mass, of the additive.

36. The method according to claim 33, wherein the graphene is 0.2% to 1% of the composition, by mass, of the additive.

37. The method according to claim 33, wherein the superplasticizer compound is one or more of the following components: lignosulfonate, naphthalene formaldehyde sulfonate, melamine formaldehyde sulfonate, polycarboxylate esters.

38. The method according to claim 33, wherein the defoaming compound is one or more of the following components: mineral oil, silicone oil, vegetable oil, polyethylene glycol, polypropylene glycol, and polymethyl acrylate.

* * * * *